United States Patent [19]

Tsuchida et al.

[11] Patent Number: 5,169,573
[45] Date of Patent: Dec. 8, 1992

[54] METHOD OF FORMING THREE-DIMENSIONAL PATTERN

[75] Inventors: Katsunori Tsuchida; Yasuo Watanabe, both of Kuga; Yasuyuki Suzuki, Tokyo, all of Japan

[73] Assignee: Mitsui Petrochemical Industries, Ltd., Tokyo, Japan

[21] Appl. No.: 651,950

[22] Filed: Feb. 7, 1991

[30] Foreign Application Priority Data

Aug. 28, 1990 [JP] Japan .................. 2-89861[U]
Sep. 2, 1990 [JP] Japan .................. 2-29976
Oct. 31, 1990 [JP] Japan .................. 2-294227

[51] Int. Cl.⁵ .............. B28B 1/16; B28B 7/34; B28B 7/36; E04B 1/16
[52] U.S. Cl. .................... 264/35; 264/246; 264/256; 264/259; 264/316; 264/333; 264/334; 264/337; 264/338; 264/DIG. 31
[58] Field of Search ............ 264/35, 245, 246, 256, 264/259, 313, 316, 333, 337, 338, DIG. 31, 334; 524/5, 650

[56] References Cited

U.S. PATENT DOCUMENTS

| | | | |
|---|---|---|---|
| 1,532,684 | 4/1925 | Carter | 264/DIG. 31 X |
| 1,564,578 | 12/1925 | Kennedy | 264/DIG. 31 X |
| 1,571,849 | 2/1926 | Long | 264/DIG. 31 X |
| 2,059,520 | 11/1936 | Harshberger | 264/246 X |
| 2,355,967 | 8/1944 | Greenwalt | 249/140 |
| 2,964,800 | 12/1960 | Dorsett | 264/112 |
| 3,096,195 | 7/1963 | Seman et al. | 264/256 X |
| 3,318,563 | 5/1967 | Downing | 249/140 |
| 3,781,396 | 12/1973 | Okuda et al. | 264/333 X |
| 4,002,713 | 1/1977 | Duncan et al. | 264/333 X |
| 4,525,500 | 6/1985 | Lynn | 524/5 |
| 4,670,208 | 6/1987 | Koblischek et al. | 524/5 |
| 4,746,365 | 5/1988 | Babcock et al. | 524/5 X |
| 4,792,360 | 12/1988 | Pierce et al. | 524/5 |
| 4,,851,456 | 7/1989 | Dean | 524/5 X |
| 4,952,104 | 8/1990 | Osada | 264/35 X |
| 4,968,734 | 11/1990 | Gaidis et al. | 524/5 |
| 5,041,475 | 8/1991 | Kambayashi et al. | 524/5 |

FOREIGN PATENT DOCUMENTS

| | | |
|---|---|---|
| 0160315 | 11/1985 | European Pat. Off. . |
| 2849770 | 5/1979 | Fed. Rep. of Germany . |
| 62-111062 | 5/1987 | Japan . |
| 649808 | 1/1951 | United Kingdom . |
| 1376895 | 12/1974 | United Kingdom . |
| 2214858 | 9/1989 | United Kingdom ................ 264/246 |

Primary Examiner—Karen Aftergut
Attorney, Agent, or Firm—Sherman and Shalloway

[57] ABSTRACT

The method of forming a three-dimensional pattern, wherein a pattern forming mold formed from an expanded polyethylene is attached to the work surface where a desired pattern is to be formed, a surfacing material of a specific acrylic resin concrete is cast onto the work surface, the surfacing material is allowed to harden, and the mold is detached and removed from the work surface.

2 Claims, 6 Drawing Sheets

METHOD OF FORMING THREE-DIMENSIONAL PATTERN

FIELD OF THE INVENTION

This invention relates to a method of forming three-dimensional patterns. More particularly, this invention relates to a method of forming desired three-dimensional patterns on the surfaces of walls, floors, etc., molds for use in that methods for forming three-dimensional patterns, as well as a tool for removing the molds used in that method.

BACKGROUND OF THE INVENTION

For the purpose of beautifying the asphalt concrete or cement concrete surfaces of floors or walls of buildings, platforms of railroad stations, concourses, pedestrian overpasses and pavements, the practice of forming brick or tile patterns or various other geometrical figures on those surfaces is gaining increasing acceptance these days. Also gaining wide acceptance is forming three-dimensional directional signs directly on walls, floors, etc.

Three most common methods proposed so far for forming three-dimensional patterns or geometrical figures on walls, floors, road surfaces, etc. include:

(a) a method comprising attaching an expanded polyethylene mold to the work surface, applying a projection forming material to fill in the mold, allowing the applied material to harden, and removing the mold by either burning or dissolving it away so as to form a pattern with intended projections and grooves (see Japanese Patent Publication No. 47593/1987);

(b) a method comprising attaching a two-layered mold (having a releasable covering material on its top) to the work surface, applying a projection forming material to fill in the mold, removing the releasable covering material before the projection forming material solidifies or hardens and, after the projection forming material hardens completely, removing the mold to form a pattern with intended projections and grooves [see Japanese Patent Application (KOKAI) No. 233264/1985]; and (c) a method which is the same as method (b) except that the mold remaining after the releasable covering material is removed is left intact as a joint filler on the work surface [see Japanese Patent Application (KOKAI), No. 111062/1987].

The three methods described above have their own defects. In method (a), the appearance of the final pattern is considerably damaged by burning the mold. Even if the mold is dissolved away with the aid of a solvent, solvent staining will occur. In method (c), the mold in the joint can later be damaged or shed from the work surface. In both methods (b) and (c), the releasable covering material has to be removed while the projection forming material remains incompletely hardened, so the unhardened projection forming material deposited on the surface of the covering material can drip in areas where projections are to be formed, which either damages the appearance of the finished pattern or presents difficulty in the pattern forming operation. Further, method (b) requires two removing steps, one for removing the releasable covering material and the other for removing the mold, and this renders the overall operation cumbersome.

A common problem to these conventional methods is that no special tool has been developed for use in removing the mold after the surfacing material hardens and the only tools available today are common screwdrivers with a thin wedge-shaped end and scrapers However, it has not been easy to remove the mold with conventional screwdrivers or scrapers. For instance, in order to remove the mold with a conventional screwdriver, the latter is inserted between the mold and the work surface and the mold is pried to be detached from the work surface. Further, the screwdriver must be kept pushed during the operation but precise removal of the mold is difficult to achieve in this way. Scrapers are suitable for the purpose of removing burrs and other projections from the work surface but not suitable for removing the mold embedded in the surfacing material.

SUMMARY OF THE INVENTION

A first object, therefore, of the present invention is to provide a method by which three-dimensional patterns can be formed in a simple and easy-to-implement manner.

A second object of the present invention is to provide a mold for use in the method described above that has a simple structure and which hence can be fabricated at low cost.

A third object of the present invention is to provide a mold that is capable of preventing the dripping of a surfacing material so as to facilitate pattern forming operation and produce a satisfactory finished surface and which therefore is suitable for the purpose of forming a desired three-dimensional pattern on the surface of a wall, floor, etc.

A fourth object of the present invention is to provide a tool with which the mold attached to the work surface for forming a three-dimensional pattern by the method described above can be detached and removed in a simple, reliable and rapid way to achieve high operational efficiency.

The first object of the present invention can be attained by a method which comprises attaching a pattern forming mold to the work surface where a desired pattern is to be formed, casting a surfacing material comprising an acrylic resin concrete composition onto the work surface, allowing the surfacing material to harden, and detaching and removing the pattern forming mold from the work surface.

The acrylic resin concrete composition used as a surfacing material preferably comprises:

(A) at least one monomer component selected from among (meth) acrylic acid and esters thereof;

(B) a polymer that can dissolve in said monomer component (A) or that is swollen by said monomer component; and (C) an aggregate.

The second object of the present invention is achieved by a mold for forming a three-dimensional pattern that is made from an expanded polyethylene.

The third object of the present invention can be achieved by a mold for use in the above-described method of forming a three-dimensional pattern and which comprises a substrate layer and at least one release layer formed as the topmost layer on the surface of said substrate layer.

Preferably, a rigid protective layer is provided between the release layer and the substrate layer.

It is also preferred that the substrate layer is chiefly made of an expanded polyethylene.

The fourth object of the present invention can be attained by a tool for use in the above-described method of forming a three-dimensional pattern to remove a mold, which tool comprises a scraping portion that has at the lower end a blade which has a shape corresponding to the pattern forming mold in such a way that it can be scraped from the work surface, a blade support connected to the upper end of the scraping portion, and a handle connected to the blade support, said blade support being partially curved in such a way that the contact between the tip of the blade and the area of the work surface from which the pattern forming mold is to be detached can be visually checked from above.

Figure 9:
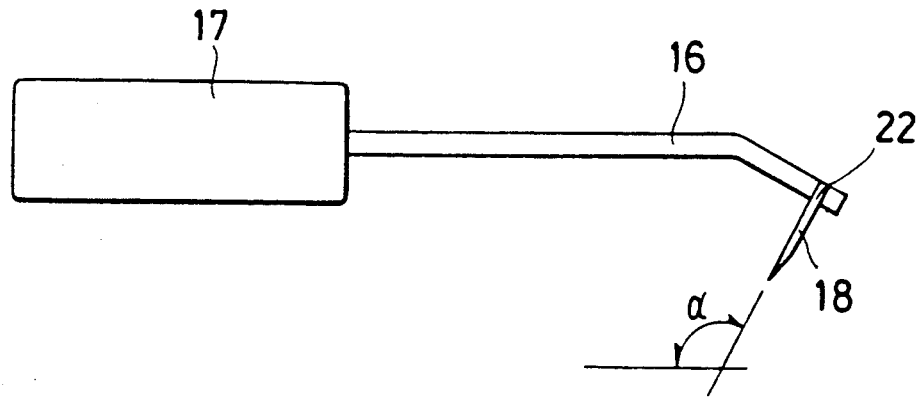
Figure 10:
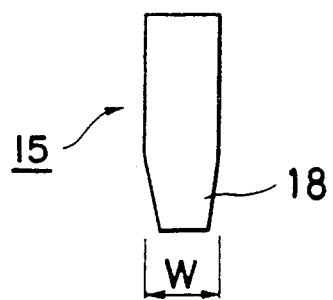
Figure 11:
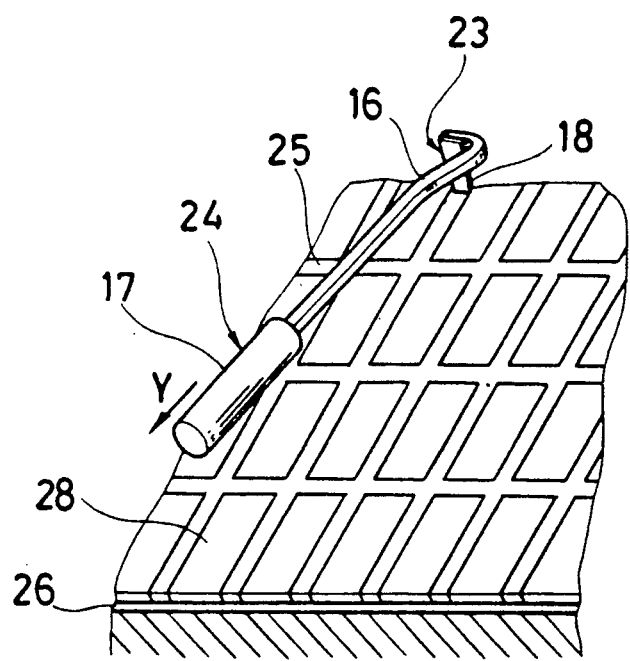
Figure 12:
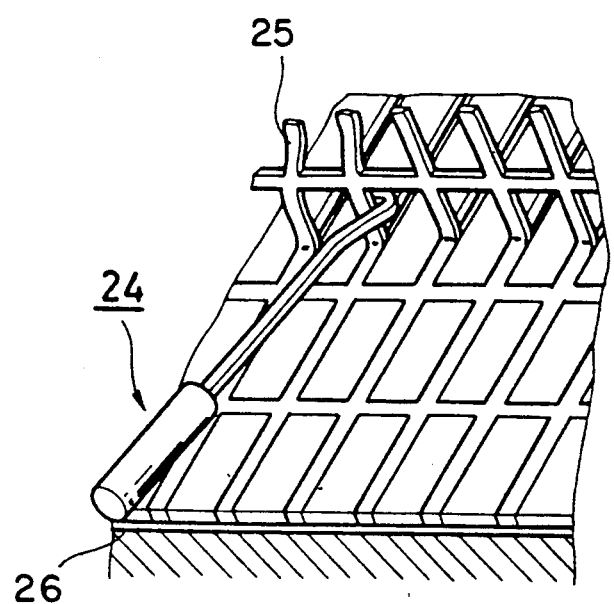

Fib. 8 is a plan view of the tool;

FIG. 9 is a rear view of the tool;

FIG. 10 is a diagram showing the scraping portion of the tool;

FIGS. 11 and 12 are diagrams showing how the tool is used to remove the pattern forming mold.

DETAILED DESCRIPTION OF THE PREFERRED EMBODIMENTS

The method of the present invention for forming three-dimensional patterns on flat surfaces such as those of pavements and walls is described below in detail with reference to FIGS. 1A-1D.

First, the area around the work surface on which a pattern is to be formed is masked. Preferably, the same area is protected against staining by covering it with a sheet. Masking may be performed by attaching adhesive tape or a commercial polyethylene masking film. A polyethylene sheet may be used as an anti-stain sheet.

In the next step, a preliminary treatment is conducted to remove grease, foreign matter like mud and water, as well as any other dirt and deposits from the work surface. When the work surface is a cement concrete or cement mortar paved surface, the preliminary treatment may be performed using a surface treating machine such as a scrabbling machine (e.g. LINAX ®) or a demarcation line remover, and if the work surface is an asphalt paved surface, a polisher fitted with wire brushes may be used.

If necessary, a primer may be coated on the work surface in order to improve adhesion to an undercoat material and a joint filler that are described hereinafter. Useful primers include methyl methacrylate (MMA) or urethane modified MMA primers such as R41, R51B of Mitsui Petrochemical Industrial Products, Ltd.

When primers are to be coated on the work surface, the coat weight is typically in the range of from about 100 to 500 $g/m^2$.

If the work surface has steps, roughness, cracks and other surface flaws, a pavement material may preliminarily be applied to make the work surface completely level. A suitable pavement material may be selected in accordance with the severity of surface flaws. If they are moderate, a resin mortar consisting of a resin composition comprising methyl methacrylate and a methacrylate polymer, mixed silica sand as an aggregate, as well as a pigment and a curing agent (e.g.R64SL of Mitsui Petrochemical Industrial Products, Ltd.) may be used. If surface flaws are severe, a resin concrete consisting of a resin composition comprising methyl methacrylate and a methacrylate polymer, gravel and silica sand as aggregates, and fillers such as calcium carbonate and a pigment (e.g. R17 of Mitsui Petrochemical Industrial Products, Ltd.) may be used.

These pavement materials can be applied to the work surface by ruling, raking or troweling.

In the next step, a joint filler for forming the joint of a brick pattern is applied as an undercoat to the level work surface. A joint filler is applied to provide a completely level coated surface so that good adhesion is insured between the work surface and a pattern forming mold which is to be attached thereto in a subsequent stage. A suitable joint filler may be selected in consideration of color contrast from the surface layer that is to be formed of a surfacing material to be discussed hereinafter which is made of an acrylic resin concrete composition. An illustrative example is a resin paste that comprises 5-15 parts by weight of an inorganic pigment as a colorant, 5-50 parts by weight of a filler such as talc, calcium carbonate or a silica sand powder, and 100 parts by weight of a resin composition chiefly made of methacrylic acid and a methyl methacrylate resin (e.g. SILICAL ®R61 of Mitsui Petrochemical Industrial Products, Ltd.)

The joint filler is typically coated in a thickness of about 0.1-2 mm.

After the joint filler hardens, marking is preferably conducted in order to insure that a pattern forming mold can be attached to an exact position on the work surface in the next step. In this case, longitudinal and transverse reference lines are preferably marked in an exact way.

Figure 1:
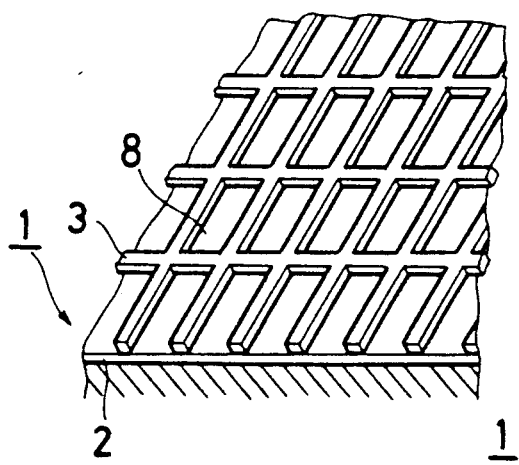
FIG. 1A-FIG. 1D shows the major steps of forming a three-dimensional pattern by the method of the present invention.
Figure 1:
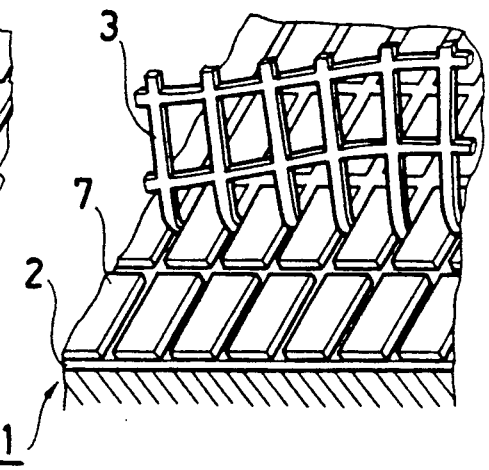
Figure 1:
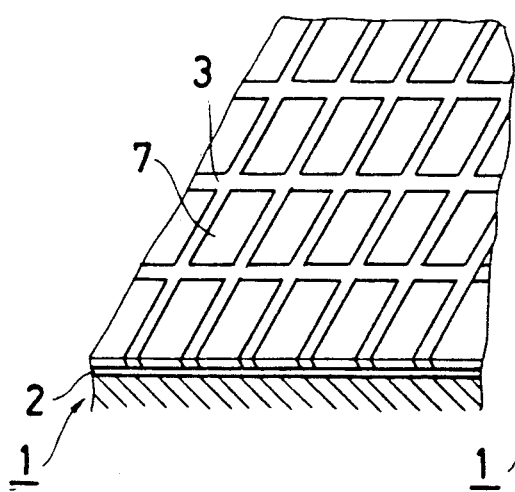
Figure 1:
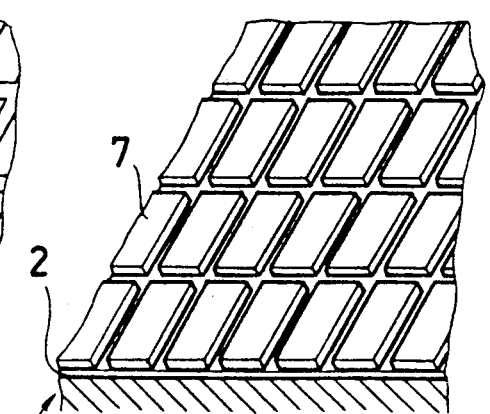

After the preliminary treatments described above, a mold 3 for forming a three-dimensional pattern (see FIG. 2) is attached to the hardened layer of joint filler 2 on top of the work surface 1 in accordance with the marked reference lines as shown in FIG. 1A.

Figure 2:
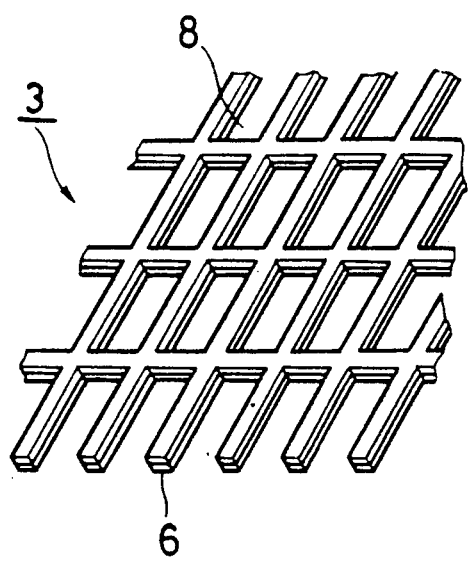
FIG. 2 shows an example of the mold for use in forming a three-dimensional pattern by said method.
Figure 3:
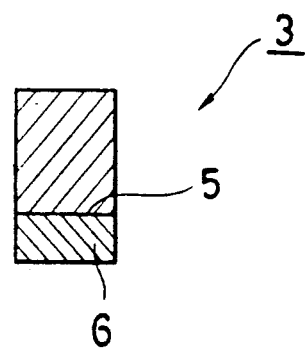
FIG. 3 is a partial enlarged cross-sectional view of said mold.

As shown in FIGS. 2 and 3, the mold 3 has an adhesive coated on its bottom surface 5 with which the mold is to be bonded to the hardened layer of joint filler 2. When not in use, the adhesive is protected with release paper 6 that is applied to the bottom surface 5.

The mold 3 may be formed of a flexible material such as an expanded polyethylene having a blow ratio of ca. 3-7. An expanded polyethylene is particularly preferred since it does not adhere to acrylic resin concrete and because it is not attacked by resin concrete.

The thickness of the mold is not limited to any particular value and may be selected as appropriate for such factors as the shape and size of the pattern to be formed. As a guide figure, the range of ca. 1-2 mm may be adopted. If the particle size of the aggregate that is incorporated as a component of the acrylic resin concrete composition which is used as the surfacing material to be described hereinafter is to be taken in account, the thickness of the mold is preferably at least 3-4 times as much the maximum particle size of the aggregate, with the range of ca. 1-5 mm being mentioned as a guide figure.

The mold 3 is preferably attached to the work surface in such a way that the two members adhere strongly to prevent lifting of the mold. If the surface of the hardened layer of joint filler 2 remains tuck, the mold 3 will sometimes fail to adhere strongly to the work surface. Hence, it is recommended that the work surface be examined and any defect such as tuck should be removed before the mold is attached.

After the mold 3 is attached to the work surface in the manner described above, the surfacing material 7 is applied or cast to fill in the open spaces 8 in the mold as shown in FIG. 1B.

An acrylic resin concrete composition is used as the surfacing material 7. The composition preferably comprises:

(A) at least one monomer component selected from among (meth) acrylic acid and ester compounds thereof;
(B) a polymer that can dissolve in said monomer component (A) or that is swollen by said monomer component; and
(C) an aggregate.

Examples of the monomer component (A) include: alkyl (meth)acrylates such as methyl acrylate, ethyl acrylate, methyl mathacrylate and ethyl methacrylate; as well as acrylic acid, methacrylic acid, 2-hydroxyethyl acrylate, 2-hydroxyethyl methacrylate, ethylene glycol di(meth)acrylate, propylene glycol di(meth)acrylate, polyethylene glycol di(meth)acrylate, polypropylene glycol di(meth)acrylate, butylene glycol di(meth)acrylate, hexylene glycol di(meth)acrylate, 2,2-bis[4-(meth)acryloyloxyphenyl]propane, 2,2-bis[4-(meth)acryloyloxycyclohexyl]propane, 2,2-bis[3-(meth)acryloyloxy-2-hydroxypropoxyphenyl]propane, trimethylolpropane tri(meth)acrylate, pentaerythritol tetra(meth)acrylate, and dipentaerythritol hexa(meth)acrylate. These compounds may be used either on their own or as admixtures.

The polymer (B) may be exemplified by homo- or copolymers of the monomers listed above, in particular, (meth)acrylate esters.

Examples of the aggregate (C) include silica sand, alumina, white Japanese marble (calcite), emery, ceramic sand and glass beads. In order to produce a colored surface layer, these aggregates may be colored. Such colored aggregates may be prepared by forming a colored layer consisting of a silane coupling agent, a pigment and a binder component over all or part of the surfaces of aggregates. Pigments may be organic or inorganic. Exemplary organic pigments include Benzidine Yellow, Hansa Yellow, Lithol Red, alizarin lake, Pigment Scarlet 3B, Brilliant Carmine 6B, Permanent Red F-5R, Permanent Red 4R, Rhodamine B Lake, Rhodamine Y Lake, Lake Red C, Para Red, Peacock Blue Lake, Phthalocyanine Blue, Aniline Black, Permanent Yellow HR, PV violet BL, quinacridone, perinone, anthraquinone, Chrome Phthal Yellow 6G, Chrome Phthal Yellow 3G and Chrome Phthal Yellow GR. Exemplary inorganic pigments include titanium oxide, zinc white, lithopone, white lead, cadmium yellow, chrome yellow, titanium yellow, zinc chromate, yellow ochre, chrome vermillion, vermillion, amber, yellow iron oxide, red iron oxide, cadmium red, red lead, prussian blue, ultramarine blue, cobalt blue, chromium oxide green, mineral violet, carbon black and iron black. While any of these organic and inorganic pigments can be used, suitable ones are selected as appropriate depending on the resin component of resin concrete.

Suitable binder components include emulsions or solutions of resins such as epoxy, urethane and acrylic urethane resins.

Preferred examples of silane coupling agents include vinyl trimethoxysilane, vinyl triethoxysilane, vinyl tris ($\beta$-methoxyethoxy)silane, vinyl triacetylsilane, and $\gamma$-methacryloxypropyl trimethoxysilane. Other silane coupling agents that can be used include vinyl trichlorosilane, and $\gamma$-[N-$\beta$-methacryloxyethyl)-N,N-dimethylammonium(chloride)]propyl trimethoxysilane.

Colored aggregates can be prepared using the aggregate, pigment, binder component and silane coupling agent described above by permitting the silane coupling agent to be present during the coating of the colorant so that it is baked to the aggregate simultaneously.

The aggregate (C) is typically incorporated in a proportion of 1-6 times the amount of (A)+(B) by volume, preferably 2-4 times the amount of (A)+(B) by volume.

The acrylic resin concrete composition that comprises monomer component (A), polymer (B) and aggregate (C) may further contain a plasticizer (D) and a polymerizable unsaturated bond containing compound (E). Exemplary plasticizers (D) are phthalic acid esters including dimethyl phthalate, dibutyl phthalate, dicyclohexyl phthalate, dipentyl phthalate, dioctyl phthalate, di-2-ethylhexyl phthalate, diisodecyl phthalate and butylbenzyl phthalate. Internal plasticizers can also be used as exemplified by $\alpha$, $\beta$-unsaturated carboxylic acid esters that are copolymerizable with monomer component (A) and more specific examples are diethyl maleate, dibutyl maleate, dioctyl maleate, dibutyl fumarate and dioctyl fumarate.

Examples of the polymerizable unsaturated bond containing compound (E) include: alkanediol di(meth)acrylates such as ethylene glycol di(meth)acrylate, 1,2-propylene glycol di(meth)acrylate, 1,3-butylene glycol di(meth)acrylate and 1,4-butylene glycol di(meth)acrylate; and (meth)acrylic acid modified epoxy resins such as 2,2-bis[3-(meth)acryloyloxy -2-hydroxypropoxyphenyl]propane, and commerce available under the trade names "RIPOXY VR-60" and "RIPOXY VR-90" from Showa Highpolymer Co., Ltd.

If components (A), (B), (D) and (E) described above are to be used in combination, their respective proportions are such that monomer component (A) is 45-85 parts by weight, polymer (B) is 5-20 parts by weight and plasticizer (D) is 1-25 parts by weight, with (E) being the balance.

The acrylic resin concrete composition can be hardened by incorporating a polymerization initiator together with the optional amine used as a cold curing accelerator. Exemplary polymerization initiators include azo compounds and peroxides such as diacyl peroxides, alkyl peroxides, aralkyl peroxides, peracids and peracid esters, with diacyl peroxides being preferred. Exemplary diacyl peroxides include dibenzoyl peroxide, diacetyl peroxide, dicapryl peroxide, dilauroyl peroxide, and distearoyl peroxide. Amines may be primary, secondary or tertiary, with tertiary amines being used advantageously. Exemplary amines include aniline, toluidine, xylidine, phenylenediamine, N,N- dimethylaniline, N,N-diethylaniline, N,N-di(β-hydroxyethyl)aniline, N,N-dimethyltoluidine, N,N diethyltoluidine, N,N-dimethylanisidine, N,N-diethylanisidine, N,N-dimethyl-p-t-butylaniline, N,N-diethyl-p-t-butylaniline, N,N-dimethyl-p-chloroaniline, diphenylamine, and N,N-(β-hydroxyethyl)-p-toluidine. Among these, tertiary amines having an electron donating substituent at least in the p-position of the benzene ring such as N,N-dimethyl-p-toluidine, N,N-dimethyl-p-butylaniline, N,N-dimethylanisidine, N,N-dimethyl-p-chloroaniline and N,N-bis (β-hydroxyethyl)-p-toluidine are preferred, with N,N-dimethyl -p-toluidine and N,N-dimethyl-p-t-butylaniline being particularly preferred.

The polymerization initiator and amines are generally used in such amounts that each is 0.1-20 parts by weight per 100 parts by weight of the sum of components (A), (B), (D) and (E).

In order to prevent insufficient progress of a surface hardening reaction due to the trapping of radicals by aerial oxygen, solid paraffins, preferably paraffin waxes having melting points of 40°-60° C. are preferably added. Such paraffins are incorporated in amounts of 0.1-1.0 part by weight per 100 parts by weight of the sum of components (A), (B), (D) and (E).

The surfacing material should be cast or applied to fill in the spaces in the mold immediately after the preparation of the acrylic resin concrete composition and in such a gentle way as to prevent the lifting of the mold from the work surface. To this end, troweling or some other techniques of application may be performed in conformity with the shape and other features of the work surface and the surface layer to be formed, with care being taken to minimize unwanted coverage of the mold with the surfacing material.

The surfacing material is typically applied in a coat weight of ca. 4 kg/m² if a surface layer 2 mm thick is to be formed.

The applied surfacing material is then cured to harden. The curing time typically ranges from ca. 30 to 90 min, preferably ca. 40 - 60 min.

After the surfacing material hardens, the mold 3 is gently pulled up starting at one end, as shown in FIG. 1C, so that it is detached and removed from the work surface. Preferably, the mold 3 is removed from the work surface immediately after the surfacing material has hardened in order to insure that the unhardened surfacing material on the mold will not drip to either foul or disfigure the finally produced pattern. If extensive coverage with the surfacing material makes it difficult to remove the mold 3 efficiently, a blade tool such as a scraper may be used to assist in the removal step. The operator is recommended to put on clean shoes or take any other precautions necessary to prevent the surface layer from being fouled during the removal of the mold. After the mold removal is completed, shedding of the surfacing material, burring of the joint and any other minor defects that can impair the appearance of the final pattern are preferably remedied.

The above-described steps lead to the formation of a brick patterned surface layer over the work surface 1 as shown in FIG. 1D.

After removing the mold, the surface layer and the joint over the work surface are thoroughly cleaned and provided with a uniform topcoat in order to prevent staining and give an appealing finish. Specific, examples of the topcoat that can be applied include R81 CLEAR and R71 CLEAR of Mitsui Petrochemical Industrial Products, Ltd. The topcoat may be applied by various methods such as roller coating, brush coating or spray coating that may be properly selected depending upon the surface to be coated. Since the topcoat being applied is prone to collect in the joint, care should be taken to insure that the topcoat is evenly applied over the surface layer with standing topcoat being absorbed by a highly absorbent roller or brush.

The applied topcoat is cured for ca. 30 min until it hardens completely. After the topcoat has hardened, the masking tape or film as well as the protective sheet are removed to complete the process of forming a desired three-dimensional pattern by the method of the present invention.

Figure 4:
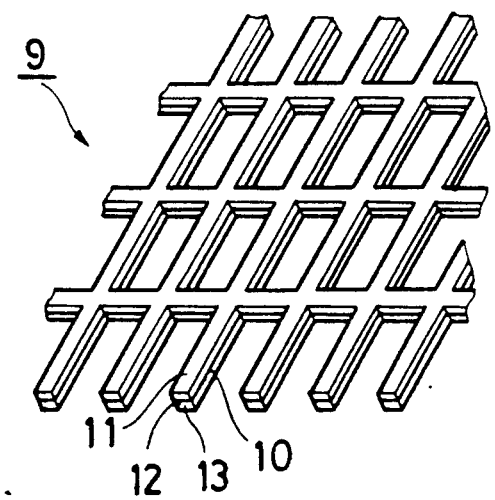
FIG. 4 is a perspective view showing a preferred example of the mold for use in forming a three-dimensional pattern by the method of the present invention.
Figure 5:
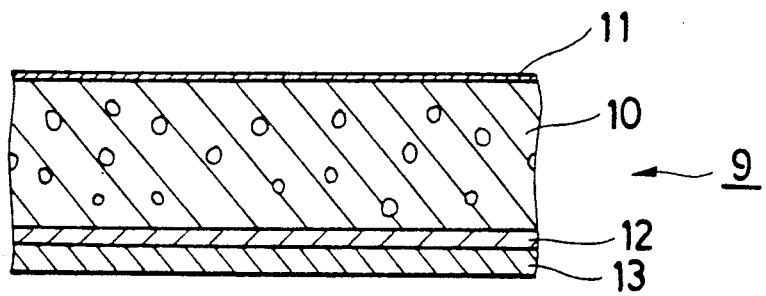
FIG. 5 is a cross section that shows schematically the mold of FIG. 4.

The foregoing description concerns an embodiment in which a three-dimensional pattern is formed using a single-layered mold. A preferred example of the mold is described below with reference to FIGS. 4 and 5. FIG. 4 is a perspective view of the preferred mold which is generally indicated by 9 and which consists basically of a substrate layer 10 and a release layer 11 on its top. Below the substrate layer 10 is provided an adhesive layer 12 which permits the substrate layer 10 to be firmly adhered to the hardened layer of joint filler. When not in use, the adhesive layer 12 is preferably protected with release paper 13 that is applied to its underside. Release paper 13 has a release agent applied to those areas which correspond to the adhesive layer 12.

The substrate layer 10 of the mold 9 may be formed of a flexible material such as an expanded polyethylene. It is particularly preferred that the substrate layer 10 is formed of an expanded polyethylene having a blow ratio of ca. 3-7 since it does not adhere to the acrylic resin concrete used as a surfacing material and because it is not attacked by resin concrete.

The thickness of the substrate layer is not limited to any particular value and may be selected as appropriate for such factors as the shape and size of the pattern to be formed. As a guide figure, the range of ca. 1-2 mm may be adopted. If the particle size of the aggregate that is incorporated as a component of the acrylic resin concrete composition which is used as the surfacing material is to be taken into account, the thickness of the substrate layer is preferably at least 3-4 times as much as the maximum particle size of the aggregate, with the range of ca. 1-5 mm being mentioned as a guide figure.

The mold 9 has at least one release layer 11 as the topmost layer on the substrate layer 10. The release layer 11 may be formed of any release agent that is releasable from the surfacing material used, and useful release agents include silicone rubber (in solvent) based compounds, wax (in solvent) based compounds and PVA based compounds. These release agents may be used either on their own or as admixtures and suitable compounds may be selected as appropriate for such factors as the material of the substrate layer.

The release layer 11 may be formed by applying a suitable release agent to the surface of the substrate layer 10. An appropriate coating method may be selected from among known techniques including spray coating and brush coating.

The adhesive layer 12 may be formed of any known adhesives including aliphatic petroleum resin (e.g. HI-REZ®), aromatic petroleum resin (e.g PETROZIN®) and petroleum resin (e.g. TACKACE®).

The release paper 13 applied to the underside of the adhesive layer 12 comprises a release agent coated at least onto those surfaces which contact the substrate layer, and such release paper serves to protect the adhesive layer when it is not in use. The release paper 13 is separated as required and the exposed adhesive layer 12 is bonded to the work surface. The release paper 13 may be of any type that is commonly used in a class of applications as contemplated by the present invention and kraft paper may be mentioned as an example. Suitable release paper may be selected as appropriate for the adhesive agent of which the adhesive layer 12 is made.

Figure 6:
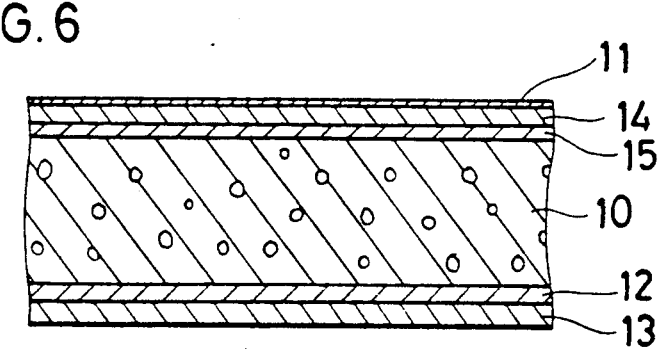
FIG. 6 is a cross section showing schematically a more preferred example of the mold.

Another example of the mold 9 is shown in FIG. 6, in which a rigid protective layer 14 is provided between the substrate layer 10 and the release layer 11 formed on top of the substrate layer 10. Since the protective layer 14 imparts appropriate rigidity to the substrate layer, the mold for forming a three-dimensional pattern can be attached to the hardened layer of joint filler with such high efficiency that even a mold having a large area can be handled without deformation. Hence the advantage of the mold having the construction shown in FIG. 6 (i.e., providing high operational efficiency) is enhanced as the area of the three-dimensional pattern to be formed increases.

The rigid protective layer 14 may be made of paper or a synthetic resin such as polyethylene and it can be formed by bonding or thermally fusing a rigid sheet of kraft paper (120 μm) onto the top surface of the substrate layer with an adhesive layer 15 being interposed.

Figure 7:
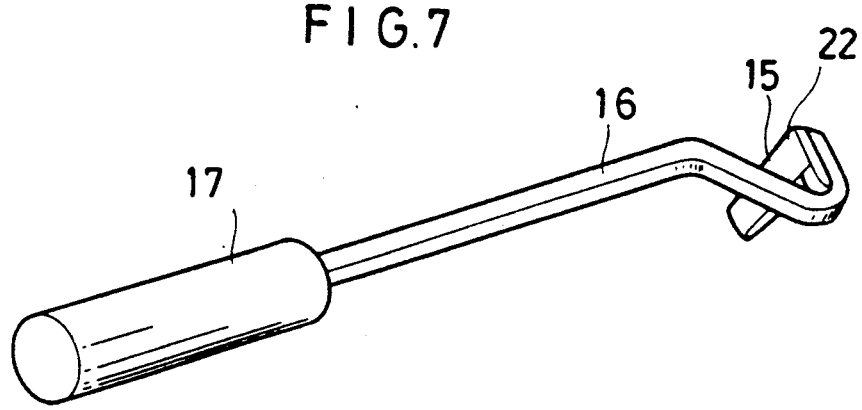
FIG. 7 is a perspective view showing an example of the tool that is advantageously used in the method of the present invention to remove a pattern mold.
Figure 8:
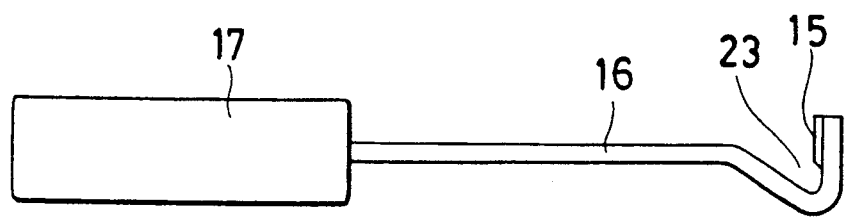

In the practice of the above-described method of forming a three-dimensional pattern, the mold attached to the work surface is preferably removed using a tool having the shape shown in FIG. 7 which is capable of detaching and removing the mold in a simple yet reliable manner. FIG. 7 is a perspective view of the tool; FIGS. 8 and 9 are a plan view and a rear view, respectively, of the tool. As shown, the tool comprises a scraping portion 15, a blade support 16 and a handle 17. As shown enlarged in FIG. 10, the scraping portion 15 has a blade 18 at the lower end which has a shape corresponding to the mold attached to the work surface in the manner to be described below in such a way that it can be scraped from the work surface. To state more specifically, the blade 18 has a width W that is typically smaller than the width of each mold by ca. 1 mm, preferably by ca. 1–2 mm, so that the mold indicated by 25 in FIGS. 11 and 12 and which is attached to the work surface 26 and embedded in the surface layer 28 can be efficiently scraped, detached and removed from the work surface.

The scraping portion 15 may be so designed that the blade 18 will contact the work surface at an angle (α) of ca. 130 degrees with respect to the work surface (see FIG. 9) and this is desired since it permits the mold to be easily detached and removed by scraping with a force smaller than what is conventionally required when common screwdrivers or scrapers are used.

The scraping portion 15 may be formed as a separate member which is detachable from the blade support and this is another preferred embodiment since only the scraping portion need be replaced if the blade is damaged or broken. In a more preferred embodiment, a plurality of blades are made available that have different widths and shapes corresponding to those of the joints to be formed on the work surface; this offers the advantage of providing greater flexibility in mold removal since many kinds of molds can be removed merely by changing the blade in accordance with the specific mold to be detached and removed.

The blade support 16 is connected at one end to the upper end 22 of the scraping portion 15, with the other end being connected to the handle 17. As shown in FIG. 8, the blade support 16 is partially curved to form a contact check portion 23 that helps the operator visually check from above the contact between the tip of the blade 18 and the area of the work surface from which the mold is to be detached. The curvature and shape of the blade support 16 in the contact check portion 23 may be selected as appropriate depending upon the shape of the mold, the state in which it is attached to the work surface, and the condition of the mold detaching and removing operation. The direction of curvature of the blade support 16 may be properly selected depending upon such factors as the operator and the condition of the removing operation. For example, when the tool is to be used by a right-handed operator or if there is an obstacle on the left side of the operator, the blade support 16 may be curved to the right since the resulting contact check portion 23 permits easy checking of the contact between the blade and the area of the work surface from which the mold is to be detached. On the other hand, when the tool is to be used by a left-handed operator or if there is an obstacle on the right side of the operator, the blade support may be curved to the left.

As already mentioned, the blade support 16 may be formed as a separate member from the scraping portion 15. If desired, the two members may be integrated into a unitary assembly. In this latter case, a plurality of unitary assembles in which contact check portion 23 has different degrees of curvature and sizes or in which the scraping portion 15 is equipped with blade 18 of different widths or shapes are made available in such a way that they are detachably connected to the handle 17. In this way, a suitable assembly of the blade support 16 and the scraping portion 15 may be selectively used as appropriate depending on the shape of the mold, the state of its attachment to the work surface, and the condition of the mold detaching and removing operation, whereby the operation of detaching and removing the mold can be performed in an efficient manner.

The handle 17 is connected to the blade support 16 and is typically in a cylindrical form that is made of wood, plastics, metals, etc. and that helps the operator obtain a firm grip during operation. Preferably, the surface of the handle 17 may be grained or provided with other anti-slip textures in order to help the operator obtain an even firmer grip.

Using the tool described above, a mold for forming a three dimensional pattern may be detached and removed from the work surface by the following procedure on the assumption that the necessary preliminary treatments, attachment of the mold onto the work surface, casting of the surfacing material and curing the applied surface layer to harden have been completed in the manner already described hereinabove. First, as shown in FIG. 11, the blade 18 on the scraping portion 15 of the tool 24 is inserted into the interface between the mold 25 and the joint 26 on the work surface. While checking through the portion 23 the contact between the tip of the blade and the area of the work surface from which the mold is to be detached, the operator who holds the handle 17 pulls the tool 24 toward himself in the direction of arrow Y along the joint 26, whereupon the mold 25 is scraped from the joint 26 as shown in FIG. 12, thereby completing the process of detaching and removing the mold from the work surface.

Preferable, the mold is detached and removed from the work surface immediately after the surfacing material has hardened in order to insure that the uncured surfacing material on the mold will not drip to either foul or disfigure the finally produced pattern. If extensive coverage with the surfacing material makes it difficult to remove the mold efficiently, a blade tool such as a scraper may be used to assist in the removal step.

While the method of the present invention has been described above in relation to the formation of a brick-shaped three-dimensional pattern on a flat surface, it should be noted that this is not the sole case for the applicability of the present invention and that it is also applicable to the formation of three-dimensional patterns in other situations such as tile facing, stone masonry and natural stone setting. It should also be noted that the shape of three-dimensional patterns that can be formed by the present invention are in no way limited to brick-shaped patterns and three-dimensional patterns of any other shapes can be formed using molds having corresponding shapes including those of animals, plants, designed pictures of scenery, characters, symbolic marks and numerals.

Using the method of the present invention, three-dimensional patterns of various shapes can be easily formed on the surfaces of walls, floors, etc. If a mold having the construction shown in FIG. 2 is used in forming a three-dimensional pattern by this method, the following two advantages will result: the mold has a simple structure and hence can be fabricated at low cost; secondly, the method of forming a desired three-dimensional pattern can be practiced in a convenient manner.

Further, by using a mold having the construction shown in FIG. 4 which has at least two layers, i.e., a substrate layer and a release layer, the dripping of a surfacing material over the mold can be prevented so as to facilitate the pattern forming operation and produce a satisfactory finished surface. The mold is therefore suitable for the purpose of forming a desired three-dimensional pattern on the surface of a wall, floor, etc.

The present invention also provides a tool for removing the mold from the work surface. By using a tool having the shape shown in FIG. 7, the mold attached to the work surface for forming a three-dimensional pattern can be detached and removed in a simple and reliable way.

What is claimed is:

1. A method of forming a three-dimensional pattern from an acrylic resin concrete composition which comprises:
    attaching a pattern forming mold to a work surface where a three-dimensional pattern is to be formed, said pattern forming mold being formed from an expanded polyethylene to thus prevent adherence of said acrylic resin concrete composition to said pattern forming mold while avoiding attack of said pattern forming mold by said acrylic resin concrete composition;
    casting onto said work surface a surfacing material of said acrylic resin concrete composition comprising:
        (A) at least one monomer compound selected from the group consisting of acrylic acid, methacrylic acid and esters thereof, in an amount of 45-85 parts by weight,
        (B) a polymer that dissolves in said monomer component (A) or that is swollen by said monomer component (A), in an amount of 5-20 parts by weight, and
        (C) an aggregate in a proportion of 1-6 times the amount of (A)+(B) by volume as said surfacing material;
    allowing said acrylic resin concrete composition of said surfacing material to harden to thus prevent dripping of unhardened surfacing material during removal of said pattern forming mold from said surfacing material; and then
    detaching and removing said pattern forming mold from said work surface and said hardened surfacing material to form said three-dimensional pattern of said hardened acrylic resin concrete composition such that said three-dimensional pattern of said hardened acrylic resin concrete composition is not fouled or disfigured by said dripping of said unhardened surfacing material.

2. A method of forming a three-dimensional pattern from an acrylic resin concrete composition which comprises:
    attaching to a work surface where a desired three-dimensional pattern is to be formed a pattern forming mold comprising a substrate layer and having at least one release layer formed thereon as a topmost layer on a surface of said substrate layer, said substrate layer being formed from an expanded polyethylene to thus prevent adherence of said acrylic resin concrete composition to said pattern forming mold while avoiding attack of said pattern forming mold by said acrylic resin concrete composition;
    casting onto said work surface a surfacing material of said acrylic resin concrete composition comprising:
        (A) at least one monomer component selected from the group consisting of acrylic acid, methacrylic acid and esters thereof, in an amount of 45-85 parts by weight,
        (B) a polymer that dissolves in said monomer component (A) or that is swollen by said monomer component (A), in an amount of 5-20 parts by weight, and
        (C) an aggregate in a proportion of 1-6 times the amount of (A)+(B) by volume as said surfacing material;
    allowing said acrylic resin concrete composition of said surfacing material to harden to thus prevent dripping of unhardened surfacing material during removal of said pattern forming mold from said hardened surfacing material; and then
    detaching and removing said pattern forming mold from said work surface and said hardened surfacing material to form said three-dimensional pattern of said hardened acrylic resin concrete composition such that said three-dimensional pattern of said hardened acrylic resin concrete composition is not fouled or disfigured by said dripping of said unhardened surfacing material.

* * * * *